United States Patent [19]

Harrison et al.

[11] Patent Number: 6,156,850
[45] Date of Patent: Dec. 5, 2000

[54] PROCESS FOR MAKING POLYALKENYL DERIVATIVE OF AN UNSATURATED ACIDIC REAGENT

[75] Inventors: James J. Harrison, Novato; William R. Ruhe, Jr., Benicia, both of Calif.

[73] Assignee: Chevron Chemical Company LLC, San Ramon, Calif.

[21] Appl. No.: 09/153,940

[22] Filed: Sep. 16, 1998

[51] Int. Cl.[7] ............................................ C08F 22/00
[52] U.S. Cl. ................... 525/329.6; 508/118; 525/181; 525/183; 525/329.5; 560/205; 562/595
[58] Field of Search ........................... 508/118; 525/181, 525/183, 329.5, 329.6; 560/205; 562/595

[56] References Cited

U.S. PATENT DOCUMENTS

| | | | |
|---|---|---|---|
| 3,189,544 | 6/1965 | Ratner et al. | 508/293 |
| 3,476,774 | 11/1969 | Zaweski et al. | 549/203 |
| 3,819,660 | 6/1974 | Cahill et al. | 260/346.8 |
| 4,110,349 | 8/1978 | Cohen | 260/533 |
| 4,235,786 | 11/1980 | Wisotsky | 260/346.74 |
| 4,883,886 | 11/1989 | Huang | 549/255 |
| 5,062,980 | 11/1991 | Migdal et al. | 508/291 |
| 5,112,507 | 5/1992 | Harrison | 508/192 |
| 5,175,225 | 12/1992 | Ruhe, Jr. | 526/272 |
| 5,241,003 | 8/1993 | Degonia et al. | 525/123 |
| 5,753,597 | 5/1998 | Harrison et al. | 508/192 |
| 5,777,025 | 7/1998 | Spencer et al. | 524/745 |

FOREIGN PATENT DOCUMENTS

| | | | |
|---|---|---|---|
| 0 014 288 | 11/1979 | European Pat. Off. | C08F 8/46 |
| 0 082 601 | 11/1982 | European Pat. Off. | C08F 222/04 |
| 0 542 380 | 5/1993 | European Pat. Off. | C08F 8/46 |
| 2 354 347 | 6/1977 | France | C08F 8/46 |
| WO 94/02571 | 2/1994 | WIPO | C10M 145/02 |
| WO 94/02572 | 2/1994 | WIPO | C10M 145/02 |

*Primary Examiner*—Paul J. Killos
*Assistant Examiner*—Taylor V Oh
*Attorney, Agent, or Firm*—W. K. Turner; R. J. Sheridan

[57] ABSTRACT

A polyalkenyl derivative of an unsaturated acidic reagent prepared by the process of reacting a polyalkene having a Mn of at least 300 with an unsaturated acidic reagent at elevated temperatures in the absence of a strong acid until at least 25% of the polyalkene is converted to a polyalkenyl derivative of an unsaturated acidic reagent, continuing the reaction of the polyalkene with an excess of the unsaturated acidic reagent at elevated temperatures in the presence of a strong acid to convert at least some of the unreacted polyalkene to additional polyalkenyl derivative of an unsaturated acidic reagent, and removing the unreacted unsaturated acidic reagent.

14 Claims, No Drawings

PROCESS FOR MAKING POLYALKENYL DERIVATIVE OF AN UNSATURATED ACIDIC REAGENT

The present invention relates to an improved process for making a polyalkenyl derivative of an unsaturated acidic reagent.

BACKGROUND OF THE INVENTION

Previously, it has been shown that the addition of a strong acid (such as sulfonic acid) to the process of preparing a polyalkenyl derivative of an unsaturated acidic reagent results in a faster rate of reaction, higher conversion, less tar, and a lower succinic ratio.

U.S. Pat. No. 3,819,660, titled "Alkenylsuccinic Anhydride Preparation," discloses the suppression of fumaric acid sublimation and tar formation during reaction of a 168 to 900 molecular weight alkene with maleic anhydride and increased yield of alkenylsuccinic anhydride by using a catalytic amount of p-alkylbenzenesulfonic acid.

U.S. Pat. No. 4,235,786, titled "Process for Producing Oil-Soluble Derivatives of Unsaturated $C_4$–$C_{10}$ Dicarboxylic Acid Materials," discloses the Ene reaction of an unsaturated $C_4$–$C_{10}$ dicarboxylic acid and a $C_{30}$–$C_{700}$ olefin carried out in the presence of an oil-soluble, strong organic acid having a pKa of less than 4, such as sulfonic acid.

U.S. Pat. No. 5,777,025, titled "Process for Preparing Polyalkenyl Substituted $C_4$ to $C_{10}$ Dicarboxylic Acid Producing Materials," discloses a process for preparing a polyalkylene derivative of a monounsaturated $C_4$ carboxylic acid by running the reaction in the presence of a sediment-inhibiting amount of an oil-soluble hydrocarbyl substituted sulfonic acid.

European Patent Application 0 542 380 A1, titled "Process for the preparation of polyalkenyl derivatives of unsaturated dicarboxylic acid materials," discloses a process for the preparation of a polyalkenyl derivative of a monoethylenically unsaturated $C_4$–$C_{10}$ dicarboxylic acid material wherein the ratio of dicarboxylic acid moieties per polyalkenyl chain is less than 1.2:1. That process comprises reacting a polyalkene having a Mn in the range of 950 to 5000 with a monoethylenically unsaturated $C_4$–$C_{10}$ dicarboxylic acid material in a mole ratio of greater than 1:1 at a temperature in the range of 1500 to 260° C. in the presence of a polyaddition-inhibiting amount of a sulfonic acid.

In all of these applications, the sulfonic acid is added at the beginning of the reaction.

SUMMARY OF THE INVENTION

The present invention provides an improved process for the preparation of a polyalkenyl derivative of an unsaturated acidic reagent. That process is based upon the discovery that starting the reaction without the strong acid, then adding that strong acid later results in a shorter residence time to obtain the same conversion.

The process comprises the steps of:

(a) reacting a polyalkene having a Mn of at least 300 with an unsaturated acidic reagent at elevated temperatures in the absence of a strong acid until at least 25% of the polyalkene is converted to a polyalkenyl derivative of an unsaturated acidic reagent;

(b) continuing the reaction of the polyalkene with an excess of the unsaturated acidic reagent at elevated temperatures in the presence of a strong acid to convert at least some of the unreacted polyalkene to additional polyalkenyl derivative of an unsaturated acidic reagent; and (c) removing the unreacted unsaturated acidic reagent.

Preferably, the reaction medium is cooled as soon as the unreacted unsaturated acidic reagent has been removed.

Preferably, in step (a), the polyalkene is reacted with an unsaturated acidic reagent in the absence of a strong acid until between 25% and 80% of the polyalkene is converted to a polyalkenyl derivative of an unsaturated acidic reagent. More preferably, the polyalkene is reacted with an unsaturated acidic reagent in the absence of a strong acid until between 60% and 75% of the polyalkene is converted to a polyalkenyl derivative of an unsaturated acidic reagent.

Preferably, the polyalkene is a polybutene. More preferably, the polybutene is a polyisobutene, most preferably wherein at least 50% of said polyisobutene has methylvinylidene end groups. Preferably, the polyalkene has a Mn of from 500 to 2500.

Preferably, the unsaturated acidic reagent is maleic anhydride. Preferably, the mole ratio of unsaturated acidic reagent to polyalkene is at least 1.0:1.

Preferably, the strong acid is an oil-soluble, strong organic acid, having a $pK_a$ of less than about 4. More preferably, it is a sulfonic acid, such as an alkyl aryl sulfonic acid, wherein the alkyl group has from 4 to 30 carbon atoms. Preferably, the sulfonic acid is present in an amount in the range of from 0.0025% to 1.0% based on the total weight of polyalkene.

DETAILED DESCRIPTION OF THE INVENTION

In its broadest aspect, the present invention involves the discovery that, in the process for the preparation of a polyalkenyl derivative of an unsaturated acidic reagent, if one starts the reaction without the strong acid, then adds that acid later in the process, one achieves results in a shorter residence time at the same conversion.

The process comprises the steps of:

(a) reacting a polyalkene having a Mn of at least 300 with an unsaturated acidic reagent at elevated temperatures in the absence of a strong acid until at least 25% of the polyalkene is converted to a polyalkenyl derivative of an unsaturated acidic reagent;

(b) continuing the reaction of the polyalkene with an excess of the unsaturated acidic reagent at elevated temperatures in the presence of a strong acid to convert at least some of the unreacted polyalkene to additional polyalkenyl derivative of an unsaturated acidic reagent; and (c) removing the unreacted unsaturated acidic reagent.

THE POLYALKENE

The polyalkene can be a polymer of a single type of olefin or it can be a copolymer of two or more types of olefins. Preferably, the polyalkene is a polybutene, more preferably a polyisobutene, and most preferably a polyisobutene wherein at least 50% of the polyisobutene has methylvinylidene end groups. Preferably, the polyalkene has a number average molecular weight (Mn) of from 500 to 2500.

THE UNSATURATED ACIDIC REAGENT

The term "unsaturated acidic reagent" refers to maleic or fumaric reactants of the general formula:

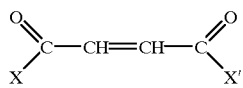

wherein X and X' are the same or different, provided that at least one of X and X' is a group that is capable of reacting to esterify alcohols, form amides, or amine salts with ammonia or amines, form metal salts with reactive metals or basically reacting metal compounds and otherwise function as acylating agents. Typically, X and/or X' is —OH, —O-hydrocarbyl, —OM+ where M+ represents one equivalent of a metal, ammonium or amine cation, —$NH_2$, —Cl, —Br, and taken together X and X' can be —O— so as to form an anhydride. Preferably, X and X' are such that both carboxylic functions can enter into acylation reactions. Maleic anhydride is a preferred unsaturated acidic reactant. Other suitable unsaturated acidic reactants include electron-deficient olefins such as monophenyl maleic anhydride; monomethyl, dimethyl, monochloro, monobromo, monofluoro, dichloro and difluoro maleic anhydride, N-phenyl maleimide and other substituted maleimides; iso-maleimides; fumaric acid, maleic acid, alkyl hydrogen maleates and fumarates, dialkyl fumarates and maleates, fumaronilic acids and maleanic acids; and maleonitrile, and fumaronitrile.

THE STRONG ACID

The term "strong acid" refers to an acid having a $pK_a$ of less than about 4. Preferably, the strong acid is an oil-soluble, strong organic acid. More preferably, the strong acid is a sulfonic acid. Still more preferably, the sulfonic acid is an alkyl aryl sulfonic acid. Most preferably, the alkyl group of said alkyl aryl sulfonic acid has from 4 to 30 carbon atoms.

Preferably, the sulfonic acid is present in an amount in the range of from 0.0025% to 1.0% based on the total weight of polyalkene.

THE PROCESS FOR PREPARING POLYALKENYL DERIVATIVES

In the preparation of the polyalkenyl derivative, the mole ratio of unsaturated acidic reagent to polyalkene is preferably at least 1.0:1. More preferably, that mole ratio is from 1.0:1 to 4.0:1.

Preferably, the unsaturated acidic reagent is added over a short time period (such as from ½ to 3 hours) instead of all at once, in order to get high conversion and minimize sediment.

In the first step of the process, the polyalkene is reacted with an unsaturated acidic reagent at elevated temperatures in the absence of a strong acid until at least 25% of the polyalkene is converted to a polyalkenyl derivative of an unsaturated acidic reagent. Preferably, between 25% and 80% of the polyalkene is converted to polyalkenyl derivative in the absence of a strong acid. More preferably, between 60% and 75% of the polyalkene is converted to polyalkenyl derivative in the absence of a strong acid.

One can measure the % conversion of the reaction by any means known to someone skilled in the art. For example one method for measuring the % actives is to elute a sample on a column of silica gel, alumina, or other suitable adsorbant using hexane or other non polar solvent. In this case the unreacted polybutene is eluted by the hexane and the PIBSA is retained on the column. After the hexane is evaporated from the sample that is eluted, the unreacted polybutene is weighed. Then subtraction of the weight of the unreacted polybutene from the total weight of sample added to the column, and then dividing this by the total weight of sample and multiplication by 100, gives the % actives. The % conversion is calculated from the weight % actives using the procedure described in U. S. Pat. No. 5,625,004.

In the second step, the reaction is continued with an excess of unsaturated acidic reagent at elevated temperatures in the presence of a strong acid to convert at least some of the unreacted polyalkene to additional polyalkenyl derivative of an unsaturated acidic reagent.

The temperature of the reaction in the first and second step can vary over a wide range. Preferably, the temperature is in the range of from 180° to 240° C. The pressure can be atmospheric, sub-atmospheric, or super-atmospheric. Preferably, the pressure is super-atmospheric.

In the third step, the unreacted unsaturated acidic reagent is removed. Preferably, the reaction medium is cooled as soon as the unreacted unsaturated acidic reagent has been removed.

EXAMPLES

The invention will be further illustrated by the following examples, which set forth particularly advantageous method embodiments. While the Examples are provided to illustrate the present invention, they are not intended to limit it.

COMPARATIVE EXAMPLES A AND B SULFONIC ACID ADDITION PRIOR TO POLYBUTENE HEATING 4000 grams of high methylvinylidene polyisobutene (BASF Glissopal 1000 in Comparative Example A and Glissopal 2300 in Comparative Example B) was added to a 12 liter stainless steel reactor in the following manner. First, approximately half of the PIB charge was added to the reactor. Then, a $C_4$–$C_{30}$ alkyl sulfonic acid was added drop-wise to the reactor. Then, the remaining PIB was added to the reactor. The reactor was heated to 232° C. under a nitrogen atmosphere. Stirring was at approximately 600 rpm. Once the reactor reached 232° C., the reactor was held at these conditions for PIB dehydration for 15 minutes. After dehydration, the reactor was pressured to approximately 25 psia using nitrogen. Once the reactor reached this pressure, the maleic anhydride was added at a constant rate (701 grams over 1.0 hour in Comparative Example A and 535 grams over 1.2 hour in Comparative Example B). At the end of the maleic anhydride addition, the reactor conditions were held for a period of six hours for Comparative Example A and three hours for Comparative Example B in order to develop data on how conversion varies with time. Samples were taken every hour during the hold period. (In an optimized reaction, the reaction would have been terminated once the desired conversion has been reached.) After the hold period, the reactor was depressurized to approximately atmospheric pressure in approximately 35 minutes. Next, vacuum was slowly applied, and the reactor depressurized to less than 50 mm mercury (absolute) over approximately 37 minutes. Once the reactor pressure reached less than 50 mm mercury (absolute), this condition was held for 53 minutes. At the end of this hold period, the vacuum was shut off, and the reactor was pressurized to approximately atmospheric pressure. The remaining reaction product was transferred to a pressure filter, and filtered. The filtered product was analyzed for saponification number and % actives.

EXAMPLES 1 AND 2 SULFONIC ACID AFTER POLYBUTENE HEATING

Examples 1 and 2 were the same as Comparative Examples A and B, respectively except that the sulfonic acid was added to the reaction mixture after at least 25% conversion.

| Example | PIB Conversion when Strong Acid added (%) | PIB Conversion (%) | | | | | |
|---|---|---|---|---|---|---|---|
| | | 1 HR | 2 HR | 3 HR | 4 HR | 5 HR | 6 HR |
| A | 0 | 52.8 | 78.9 | 86.8 | 90.0 | 91.5 | 92.4 |
| 1 | 67.6% | 67.6 | 83.4 | 89.2 | 91.2 | 92.3 | 93.1 |
| B | 0 | 56.0 | 80.9 | 89.0 | | | |
| 2 | 66.6% | 66.6 | 84.0 | 89.7 | | | |

Comparing Comparative Example A with Example 1, or Comparative Example B with Example 2, shows that one can achieve similar conversions in less time, or higher conversions in the same time, by adding the strong acid after a significant amount PIB has already been converted.

While the present invention has been described with reference to specific embodiments, this application is intended to cover those various changes and substitutions that may be made by those skilled in the art without departing from the spirit and scope of the appended claims.

What is claimed is:

1. A process for the preparation of a polyalkenyl derivative of an unsaturated acidic reagent, said process comprising the steps of:

(a) reacting a polyalkene having a Mn of at least 300 with an unsaturated acidic reagent at elevated temperatures in the absence of a strong acid until at between 25% and 80% of the polyalkene is converted to a polyalkenyl derivative of an unsaturated acidic reagent;

(b) continuing the reaction of said polyalkene with an excess of said unsaturated acidic reagent at elevated temperatures in the presence of a strong acid to convert at least some of the unreacted polyalkene to additional polyalkenyl derivative of an unsaturated acidic reagent; and (c) removing the unreacted unsaturated acidic reagent.

2. A process according to claim 1, wherein the reaction medium is cooled as soon as the unreacted unsaturated acidic reagent is removed.

3. A process according to claim 1, wherein in step (a), the polyalkene is reacted with an unsaturated acidic reagent in the absence of a strong acid until between 60% and 75% of the polyalkene is converted to a polyalkenyl derivative of an unsaturated acidic reagent.

4. A process according to claim 1 wherein said polyalkene is a polybutene.

5. A process according to claim 4 wherein said polybutene is a polyisobutene.

6. A process according to claim 5 wherein at least 50% of said polyisobutene has methylvinylidene end groups.

7. A process according to claim 1 wherein said polyalkene has a Mn of from 500 to 2500.

8. A process according to claim 1 wherein said unsaturated acidic reagent is maleic anhydride.

9. A process according to claim 1 wherein the mole ratio of unsaturated acidic reagent to polyalkene is at least 1.0:1.

10. A process according to claim 1 wherein said strong acid is an oil-soluble, strong organic acid.

11. A process according to claim 10 wherein said strong acid is a sulfonic acid.

12. A process according to claim 11 wherein said sulfonic acid is an alkyl aryl sulfonic acid.

13. A process according to claim 12 wherein said alkyl group of said alkyl aryl sulfonic acid has from 4 to 30 carbon atoms.

14. A process according to claim 11 wherein the sulfonic acid is present in an amount in the range of from 0.0025% to 1.0% based on the total weight of polyalkene.

* * * * *